UNITED STATES PATENT OFFICE.

EDWIN W. TUCKER, OF SAN FRANCISCO, CALIFORNIA.

NON-CONDUCTING COVERING.

SPECIFICATION forming part of Letters Patent No. 532,407, dated January 8, 1895.

Application filed July 7, 1893. Serial No. 479,859. (No specimens.)

*To all whom it may concern:*

Be it known that I, EDWIN W. TUCKER, a citizen of the United States, residing at the city and county of San Francisco, and State of California, have invented certain new and useful Improvements in Non-Conducting Coverings for Boilers and other Heated Surfaces; and I do hereby declare the following to be a full, clear, and exact description of said invention, such as will enable others skilled in the art to which it most nearly appertains to make, use, and practice the same.

My invention relates to a non-conducting composition for covering heated surfaces composed of a major proportion of rice-hulls, which form of themselves the principal non-conducting element of the composition, and a minor proportion of asbestos fiber, carbonate or calcined magnesia and glue water to form binding materials for the composition, and prevent the same from cracking.

In one form of embodying or applying my invention, it may be wrought into tiles or covering sections for heated surfaces. These tiles or sections include as their essential elements rice-hulls, and any suitable fibrous material, which will bind the rice-hulls together, and shield or protect them from fracture. This fibrous material, so far as my invention applies to molded, ribbed or corrugated tiles or sections, may be animal hair, wool, asbestos fiber, sheet asbestos, shoddy, and various other materials which are not readily affected by heat. The proportions of rice-hulls, carbonate of, or calcined, magnesia, fibrous material, and glue water, may be widely varied for different purposes. A composition which is well adapted to the purpose may be composed of:—rice-hulls, seventy parts; carbonate of or calcined magnesia, fifteen parts; asbestos fiber, fifteen parts; mixed with glue water. This composition may be mixed up into a suitable paste, the carbonate of magnesia and the fibrous material being thoroughly incorporated with the rice-hulls by stirring, and the composition may then be molded into tiles or sections of the desired shape or size.

When employed in covering a boiler, steam-pipe or other object, the ribbed or corrugated tiles or sections molded in proper form, may be placed upon the exterior of the vessel or pipe and drawn close together so as to entirely cover the same, and then an outer jacket of canvas, sheet metal or other material may be applied to protect it from being injured from any cause to which it may be subjected. In covering a vessel or pipe with these corrugated molded tiles or sections, a small quantity of the composition may be placed in the joints if found necessary, and also serve by its adhesive properties to hold the corrugated sections closely together.

I am aware that it is not new to employ rice-hulls in small quantities in a non-conducting composition, the rice-hulls being combined with other ingredients such as steattite, fire-clay, hair &c., in order to produce a composition which when applied to the surface to be covered will harden into a stone-like casing or shell. In such use the rice hulls do not form themselves the principal non-conducting element of the composition, and Letters Patent to I. L. Merrell, No. 170,099, dated November 16, 1875, describe the use of such a composition to form a hard impervious shell or stone-like casing around a non-conducting covering whose principal ingredient is sawdust, hair or other fiber.

My composition, whether applied in a plastic state, by placing it over the surface of a pipe or boiler, or by molding it into ribbed or corrugated tiles or sections, includes as its principal element a major proportion of rice-hulls, and these rice-hulls form of themselves, and are depended on to form the principal non-conducting material of the composition.

A composition of about the proportion and construction set forth by me is very desirable, because of its extreme lightness, toughness and durability which make it easy to handle and apply, to the pipe, boiler or other vessel to be covered by it.

What I claim as my invention, and desire to secure by Letters Patent, is—

The herein described non-conducting composition for covering heated surfaces, consisting of a major proportion of rice-hulls, and a minor proportion of carbonate of magnesia, asbestos fiber, and glue-water to bind the rice-hulls together, substantially as specified.

EDWIN W. TUCKER.

Witnesses:
CHAS. J. ARMBRUSTER,
JAMES C. ADAMS.